KIYOSHI INOUE
INVENTOR

BY Karl F. Ross
AGENT

3,370,942
LOW-FRICTION MATERIALS AND BODIES INCORPORATING SAME

Kiyoshi Inoue, 100 Sakato, Kawasaki, Kanagawa, Tokyo, Japan
Continuation-in-part of application Ser. No. 327,450, Dec. 2, 1963. This application July 15, 1964, Ser. No. 382,761
Claims priority, application Japan, Aug. 26, 1963, 38/45,612; Feb. 3, 1964, 39/5,500; Feb. 10, 1964, 39/6,774
10 Claims. (Cl. 75—134)

This is a continuation-in-part of application Ser No. 327,450, filed Dec. 2, 1963, now Patent No. 3,323,911.

My present invention relates to metallic materials having low frictional wear upon displacement in contact with surfaces frictionally engaging these materials.

In the aforementioned copending application, I describe an improved material surprisingly satisfactory for use is sustaining electrical discharge and as electrical-contact materials while having relatively low frictional wear. Although this copending application relates primarily to electrically conductive materials capable of being used as electrodes (e.g., for spark plugs) and contact materials for switches and the like, there is disclosed therein the fact that the incorporation of certain specific oxides in a proportion of 0.2 and 10% by weight markedly improves the wear resistance of the materials and enables them to be used in cutting tools, bearings and the like. The specific oxides disclosed as suitable in the earlier application include cuprous and cupric oxides, iron oxides (FeO, $Fe_2O_3$ and $Fe_3O_4$), nickel oxide, sodium oxide, cesium oxide, calcium oxide, tin oxide, lead oxide, zinc oxide, beryllium oxide, silver oxide ($Ag_2O$), aluminum oxide and chromium oxide. One or more of these oxides and, preferably, cuprous oxide, is incorporated in a solid solution in a base material selected from the group consisting of copper, iron, nickel, silver, titanium, tin, zinc, cadmium or lead, the base metal being alloyed—under certain circumstances—with a hardening agent (e.g., chromium or tungsten) or one of the harder base metals mentioned above, when a relatively soft base metal is present in major proportions. It has thus been found that metals of the aforedescribed compositions have improved capabilities as discharge electrodes or contact materials apparently as a consequence of the formation of an ion shield, whose existence is dependent upon the incorporation of one or more of the above oxides in the base metal. It was even more surprising, therefore, that such materials should have a vastly improved wear resistance. It has also been found to be an essential feature of this prior development that the oxide or oxides to be incorporated in the base metal should constitute at least 1% by weight thereof.

It is the principal object of the present invention to extend the principles set forth in my above-identified copending application to improved wear-resistant materials for use in cutting tools, piston rings, bearings and the like.

It is a more specific object of this invention to provide bearing materials having low frictional coefficients and decremental ratios, especially at elevated speeds, but which are relatively inexpensive and which can be produced with ease.

Still another object of this invention is to provide improved bodies having wear-resistant surfaces and composed of improved low-friction materials.

According to the present invention and in extension of my disclosures as set forth in the aforementioned copending application, I have found that certain specific oxides can be incorporated into substantially any base metal in order to decrease the frictional coefficient of the resulting body. Surprisingly enough, these oxides need not have the flaky and lubricating qualities of graphite and other well-known lubricants, such as molybdenum disulfide, but may even be considered refractory oxides from the point of view of their relatively high melting points. This is not to say, however, that all of the oxides must have melting points or decomposition above the melting point of the metal in which they are incorporated.

While the possible modes of operation of the various oxides will be discussed in greater detail hereinafter, it may be noted that an important characteristic of the present invention is that the abovementioned oxides be present in an amount ranging between substantially 1 and 20% by weight of the base metal with each oxide being present in an amount upwardly of about 0.2% by weight of the bearing material and preferably 1%. I have found that the following materials give the most effective results and that synergistic effects result from the combination of two or more of them, especially as described hereinbelow: osmium tetroxide ($OsO_4$), aluminum oxide ($Al_2O_3$), antimony oxide ($Sb_2O_3$), tellurium oxide ($TeO_2$), bismuth oxide ($BiO_3$), molybdenum trioxide ($MoO_3$), germanium dioxide ($GeO_2$), magnesium oxide ($MgO$), lead oxide ($PbO$), boron trioxide ($B_2O_3$), tungsten oxides ($WO_2$ and $WO_3$), ytterbium oxide ($Y_2O_3$), barium oxide ($BaO$), copper oxides ($Cu_2O$ and $CuO$), iron oxide ($Fe_2O_3$), zirconium oxide ($ZrO_2$), vanadium oxides ($V_2O_3$ and $V_2O_5$), titanium oxide ($TiO_2$), manganese oxide ($MnO$ and $Mn_2O_3$), cobalt oxide ($CoO$), and nickel oxide ($NiO$). The base metals may include silver, nickel, copper, lead, tin cadmium, aluminum, indium, iron and chromium; additionally, the base material can include binary or ternary compounds such as intermetallic compositions of these metals, iron and tungsten carbides or carbon.

More specifically it may be noted that the incorporation of vanadium oxide (in an amount greater than 1% by weight of the wear-resistant body, alone but preferably a combination with one of the other suitable oxides listed above, has been found to give most effective results. In all cases, however, it will be observed that the oxide component should form a solid solution in the base material. Suitable combinations of oxides including a preponderance of vanadium oxide may be given as follows:

| | Percent by weight |
|---|---|
| Osmium tetroxide | 20 |
| Antimony oxide | 20 |
| Tungsten oxide ($WO_3$) | 20 |
| Vanadium pentoxide | 40 |

When this composition, in amounts upwardly of 1% by weight and preferably between substantially 5 and 7% by weight was incorporated as a solid solution in a base metal such as copper, a material having excellent properties for use in internal-combustion-engine piston rings was produced. Another oxide composition having utility for this purpose included 20% by weight each of vanadium pentoxide, tellurium dioxide, lead oxide and copper oxide ($CuO$) and 10% by weight each of manganese oxide and tungsten trioxide. A composition suitable for use as a cutting tool included vanadium ($V_2O_3$), molybdenum trioxide, bismuth trioxide, boron trioxide, zirconium dioxide, barium oxide, aluminum oxide and magnesium oxide. A composition of high-carbon steel including antimony oxide, tellurium oxide, molybdenum oxide, copper oxide ($Cu_2O$) and lead oxide, in combination with vanadium pentoxide resulted in a cutting tool having vastly superior wear-resistant properties as compared with the same steel, absent these oxides.

While the theoretical explanation for the wear-resistant characteristics described above is not readily apparent and, in view of the general lack of concrete knowledge of the interfacial properties of bearing materials, such a lack of ability to provide a complete explanation is not unexpected, it may be noted that earlier theories of bearing action have observed that the presence of oxide coatings, preformed or produced in situ at the interface, are a necessary part of self-lubrication and are vital to a reduction in frictional wear and so-called "ploughing" effects. It has long been suggested that wear in the regions of frictional engagement of a bearing surface or cutting tool with a contacting surface may arise in no small measure from an adhesion (welding) and interdiffusion at the interface as a consequence of the elevated temperatures at this interface deriving from frictional heat. It is thus plausible that the improved wear-resistant characteristics of the materials described above may derive in no small measure from the fact that a solid solution of the oxides in the base material or their physical incorporation in the latter in the absence of the formation of a true solid solution may preclude the formation of interfacial welds or adhesions. Moreover, the fact that some of the oxide molecules incorporated in the bearing- or cutting-tool body will always be disposed at the interfacial surface at which frictional engagement takes place, ensures that interfacial characteristics, closely approximating those prevalent when an oxide layer is present, will be observed. Thus it may be a factor in the improved wear-resistant properties of these bodies that the oxides lower the shear strength of any weld or adhesion which may be formed at the interface and thus reduce the fretting corrosion characterizing the deterioration of most bearing surfaces. It is interesting to note that a suitable oxide in accordance with the present invention for bodily incorporation in solid solution into a bearing is $Fe_2O_3$, a substance normally considered to be a poor oxide layer on the surface of a bearing when formed in situ. This indicates that the solid solution of an oxide in the mass of bearing material may differ in its mode of operation from an oxide layer formed in situ at the interface or performed on one of the bearing surfaces.

The above and other objects, features and advantages of the present invention will become more readily apparent from the following examples and description, reference being made to the accompanying drawings in which.

EXAMPLE I

*Bearing*

An annular bearing disk having an outside diameter of 3.5 cm., an inside diameter of 2 cm., and a thickness of 1 cm., is produced by dissolving 5% of the most suitable oxide, $V_2O_5$ in copper to form a solid solution. A similar control disk is provided from pure copper (without any detectable oxide content) and the frictional characteristics of the disks are tested by holding them against a heat-treated steel plate with an axial force of 8 kg. and rotating them at 1000 r.p.m. After 5 minutes, the copper control disk showed a melted or fusion zone of 3 mm. adjacent its inner periphery and was found to have a temperature of 110° C., measured at a point remote from the contacting faces. The copper/vanadium-oxide disk of the present invention, however, after rotation for 5 minutes at the same rate, was found to have a temperature of 40° C. at the corresponding point and to have experienced no measurable wear.

EXAMPLE II

A piston ring for a motor-vehicle internal-combustion engine was made from a solid solution of a mixture of the following oxides in copper: 20% by weight osmium tetroxide, 20% by weight $Sb_2O_3$, 40% by weight $V_2O_5$ and 20% by weight of $WO_3$. A series of tests was carried out with piston rings containing 1% by weight of the mixture and 5–7% by weight of the mixture respectively. Three samples, two at each of the mixture concentrations indicated and one of copper containing no additives were used. The tests were carried out at a subatmospheric pressure of $10^{-4}$ mm. of mercury to minimize the effects of interfacial oxidation and in situ formation of an oxide film. With the sample containing 1% of the mixture, the friction coefficient was reduced by half whereas, with the 5–7% mixture the friction coefficient was reduced to one fifth of its original value.

For piston rings prepared as above, the following base materials have been tested and found to be suitable: silver, nickel, copper, lead, tin, cadmium, aluminum, indium, iron, chromium, iron carbide, carbon and tungsten carbide. As additives, the following oxides were used alone and in mixtures with the total oxide content ranging from 1–20%, with each of the oxides present in an amount of at least about 1%: $OsO_4$, $Sb_2O_3$, $TeO_2$, $MoO_3$, $GeO_2$, $PbO$, $WO_3$, $Y_2O_3$, $Cu_2O$, $Fe_2O_3$, $V_2O_5$, $TiO_2$, $MnO$, $WO_2$, $CoO$, $NiO$, and $Mn_2O_3$. In each case a marked decrease in the coefficient of friction, when compared with the base material alone, was observed. When two or more oxides including particularly vanadium oxide, were used, the decrease in coefficient of friction was found to be greater than the sum of the effects of the oxides individually.

EXAMPLE III

Figure 1:
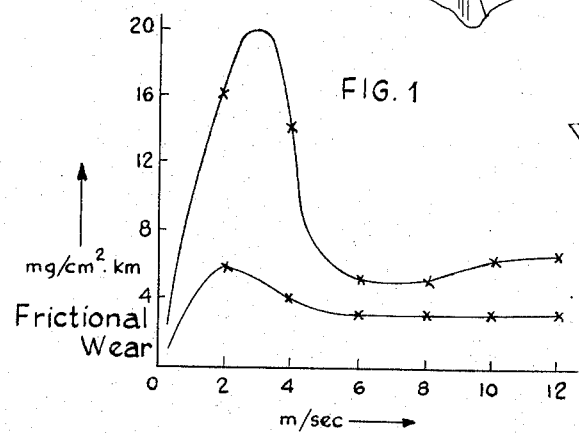
FIG. 1 is a graph of the frictional wear of a piston ring according to the present invention plotted against the piston speed.

10% by weight of a mixture of oxides was dissolved in copper, the mixture consisting 20% by weight each of $V_2O_5$, $TeO_2$, $PbO$, and $CuO$ and 10% by weight of $MnO$ and $WO_3$. The piston rings produced in this manner were tested against plain copper rings in a friction test with a contact pressure of 10 kg./cm.² The decremental ratio or wear in milligram/cm.²/km. is plotted in the lower curve of the graph of FIG. 1 against speed in m./sec. From the graph it can be seen that the ordinary copper piston ring (upper curve) has 3–4 times more wear at a speed of 3 m./sec. than the improved ring. In general, tests showed that a gain in the useful life of the piston ring from 3–5 times was obtained.

EXAMPLE IV

A set of motor slip rings was produced containing 7% $V_2O_5$ in copper as a solid solution. When the slip rings were embodied in a generator operating at 3000 r.p.m., the wear of the improved ring was found to be 70% less than that of a conventional copper ring in similar use. Silver and silver/copper alloys were used as base materials as substitutes for copper in the composition of Example III; similar results were obtained.

EXAMPLE V

A cutting tool was produced by incorporating 5–20% by weight of one or more of the oxides listed above alone or in combination with the following oxides in high-speed steel or tungsten-carbide tool material: $V_2O_3$, $MoO_3$, $Bi_2O_3$, $ZrO_2$, $B_2O_3$, $BaO$, $Al_2O_3$ and $MgO$.

Figure 3:
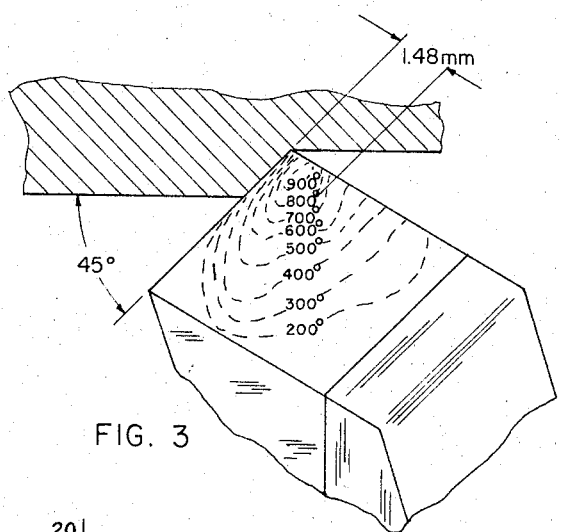
FIG. 3 is a plan view of a cutting tool diagrammatically illustrating the thermal gradient therein.
Figure 4:
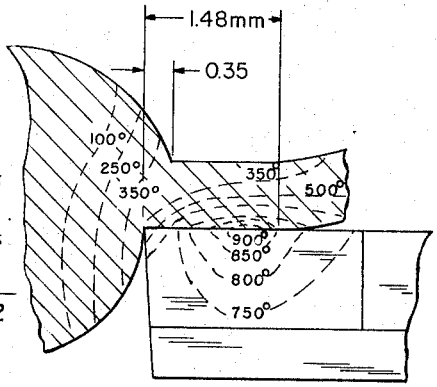
FIG. 4 is an elevational view of this cutting tool.
Figure 2:
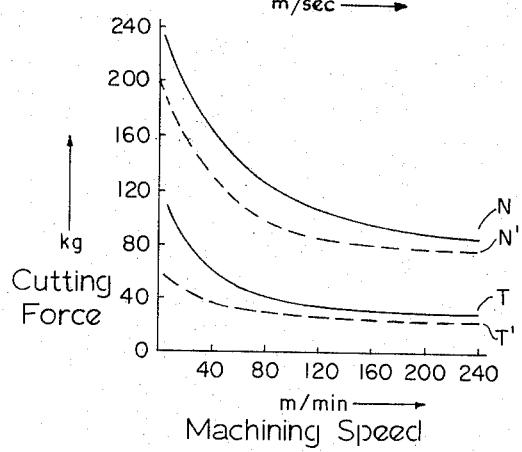
FIG. 2 is a graph of the cutting force (plotted along the ordinate) vs. the machining speed for a lathe cutting tool, contrasting a material in accordance with the present invention with a conventional cutting material.

A 0.17% carbon-steel workpiece was machined in a lathe with a machining speed of 180 mm./min. with a depth of cut of 0.5 mm. The tool bit is a high-carbon steel (type S4OC) and temperature measurements gave the gradients illustrated in FIGS. 3 and 4 so that even at a distance of 1.0–1.2 mm. from the cutting face the tool was at a temperature of 900° C. The various isotherms are indicated by broken lines. When oxide additives were included in the steel in the following amounts: 4% by weight $Sb_2O_3$, 4% by weight $V_2O_5$, 2% by weight $TeO_2$, 2% by weight $MoO_3$, 1% by weight $Cu_2O$ and 3% by weight PbO, a temperature of 900° C. was found no further than 0.5 mm. away from the cutting face. With a cutting angle of 10°, it was possible to machine the workpiece with radial cutting force N and N' for the conventional steel tool and that containing the additive, respectively, as plotted in FIG. 2, the corresponding tangential forces T and T' being also indicated. In all cases, an increase in the useful life of the tool of 4–10 times was obtained. Similar results were observed when the additives were supplied to tungsten carbide.

The invention described and illustrated is believed to admit of many modifications within the ability of persons skilled in the art, all such modifications being considered within the spirit and scope of the appended claims.

What is claimed is:

1. A composition of matter having low frictional wear, consisting essentially of at least one base material selected from the group consisting of copper, iron, nickel, silver, lead, tin, cadmium, aluminum, indium, chromium, iron carbide, tungsten carbide and carbon, and between substantially 1% and 20% by weight of an oxide component substantially entirely in solid solution in said base material and consisting of at least one oxide selected from the group consisting of osmium tetroxide, aluminum oxide, antimony oxide, tellurium oxide, bismuth oxide, molybdenum trioxide, germanium oxide, magnesium oxide, lead oxide, boron trioxide, tungsten oxides, ytterbium oxide, barium oxide, copper oxides, iron oxide, zirconium oxide, vanadium oxides, titanium oxide, manganese oxides, cobald oxide and nickel oxide, said oxide component including at least 1% by weight vanadium pentoxide and a plurality of others of the enumerated oxides each present in an amount in excess of substantially 0.2% by weight of said composition.

2. The composition as defined in claim 1 wherein said base material is copper and contains between substantially 1 and 7% by weight of an oxide component consisting of substantially 20 weight-percent osmium tetroxide, 20 weight-percent antimony trioxide, 40 weight-percent vanadium pentoxide and 20 weight-percent tungsten trioxide.

3. The composition defined in claim 1 wherein said base material is copper and contains substantially 10% by weight of an oxide component consisting of substantially 20 weight-percent vanadium pentoxide, 20 weight-percent lead monoxide, 20 weight-percent copper monoxide, 10 weight-percent manganese monoxide and 10 weight-percent tungsten trioxide.

4. The composition defined in claim 1 wherein said base material is iron and contains an oxide component consisting essentially of 4 weight-percent antimony trioxide, 4 weight-percent vanadium pentoxide, 2 weight-percent tellurium dioxide, 2 weight-percent molybdenum trioxide, 1 weight-percent cuprous oxide and 3 weight-percent lead monoxide, all percents being in terms of the mass of the composition.

5. The composition defined in claim 1 wherein said base material is tungsten carbide and contains an oxide component consisting essentially of 4 weight-percent antimony trioxide, 4 weight-percent vanadium pentoxide, 2 weight-percent tellurium dioxide, 2 weight-percent molybdenum trioxide, 1 weight-percent cuprous oxide and 3 weight-percent lead monoxide, all percents being in terms of the mass of the composition.

6. The composition defined in claim 1 wherein said base material is copper and contains substantially 7% by weight vanadium pentoxide in solid solution.

7. A cutting tool for the machining of metals consisting essentially of a base material selected from the group which consists of iron and tungsten carbide and an oxide component in solid solution therein, said oxide component consisting essentially of 4 weight-percent antimony trioxide, 4 weight-percent vanadium pentoxide, 2 weight-percent tellurium dioxide, 2 weight-percent molybdenum trioxide, 1 weight-percent cuprous oxide and 3 weight-percent lead monoxide, all percents being in terms of the mass of the composition.

8. A slip ring for an electrical machine consisting essentially of a base material selected from the group consisting of copper, silver and silver-copper alloys and an oxide component in solid solution therein, and containing substantially 7% by weight vanadium pentoxide in solid solution.

9. A piston ring for an internal-combustion engine consisting essentially of copper and 1 to 7% by weight of an oxide component in solid solution therein, said oxide component consisting of substantially 20 weight-percent osmium tetroxide, 20 weight-percent antimony trioxide, 40 weight-percent vanadium pentoxide and 20 weight-percent tungsten trioxide.

10. A piston ring for an internal-combustion engine consisting essentially of copper and substantially 10% by weight of an oxide component in solid solution therein, said solid component consisting of substantially 20 weight-percent osmium tetroxide, 20 weight-percent antimony trioxide, 40 weight-percent vanadium pentoxide and 20 weight-percent tungsten trioxide.

References Cited

UNITED STATES PATENTS

| 2,972,529 | 2/1961 | Alexander et al. | 75—134 |
| 3,028,234 | 4/1962 | Alexander et al. | 75—134 |

FOREIGN PATENTS

| 214,338 | 3/1958 | Australia. |
| 542,630 | 6/1957 | Canada. |

DAVID L. RECK, *Primary Examiner.*

RICHARD O. DEAN, *Examiner.*